G. E. TERRY.
BUTTER CONTAINER AND CUTTER.
APPLICATION FILED FEB. 14, 1914.

1,123,623.

Patented Jan. 5, 1915.
2 SHEETS—SHEET 1.

Witnesses
E. Baker
A. Tosh Jr

Inventor
Geo. E. Terry
By S. Brashears
Attorney

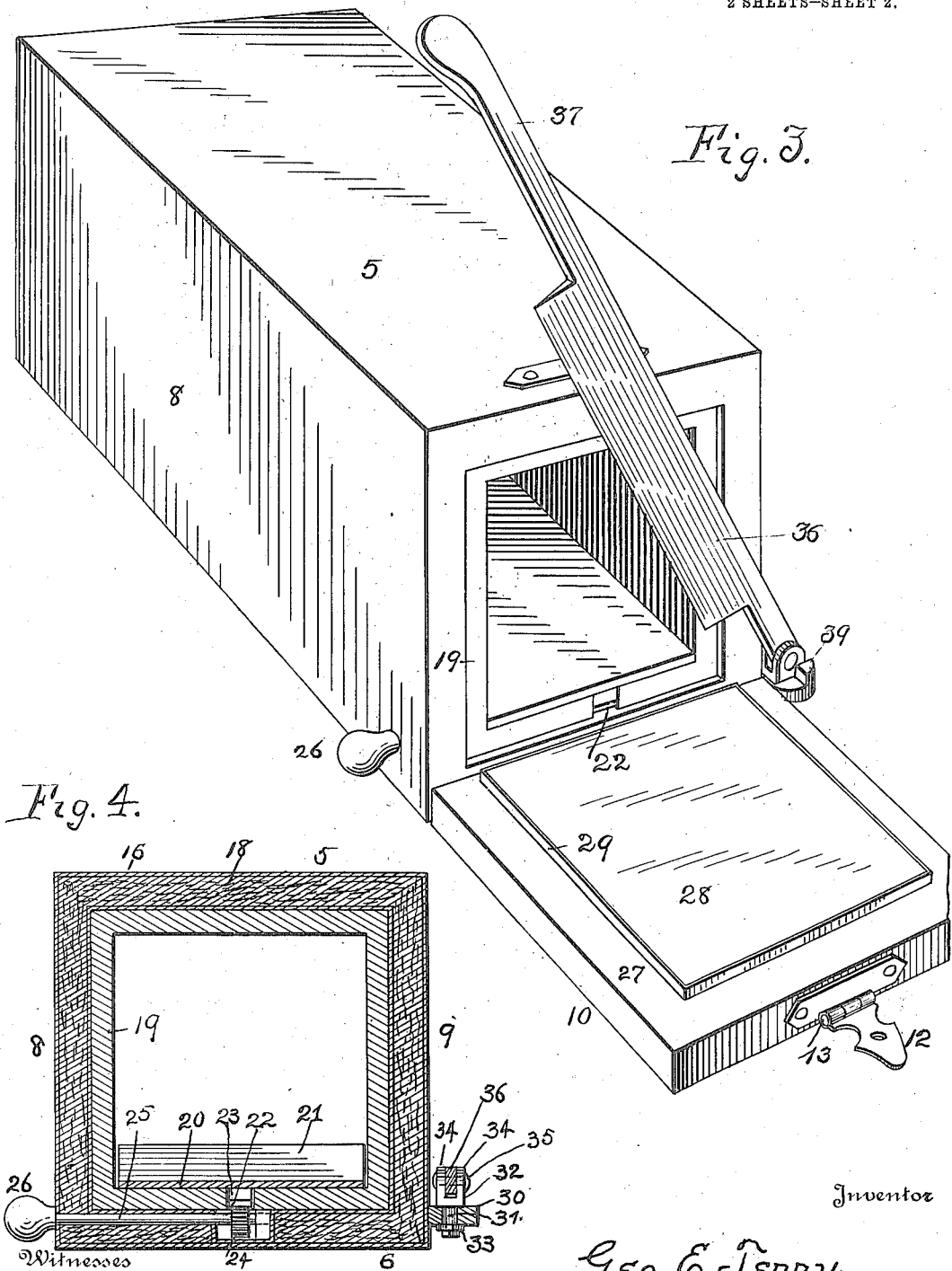

UNITED STATES PATENT OFFICE.

GEORGE E. TERRY, OF SAN FRANCISCO, CALIFORNIA.

BUTTER CONTAINER AND CUTTER.

1,123,623.        Specification of Letters Patent.        Patented Jan. 5, 1915.

Application filed February 14, 1914. Serial No. 818,791.

*To all whom it may concern:*

Be it known that I, GEORGE E. TERRY, a citizen of the United States, residing at San Francisco, in the county of San Francisco and State of California, have invented certain new and useful Improvements in Butter Containers and Cutters, of which the following is a specification.

This invention is in the nature of a butter container and cutter and has for its primary object to provide a device of this character which will be simple in construction, effective in operation and not liable to breakage or disarrangement with ordinary usage.

A further object of the invention is to provide a device of this character with a knife attached to the body, always ready for use, and with means for holding the knife when not in use.

A further object of the invention is to provide a generally improved device of the specified character and with these objects in view the invention consists in the improved construction, arrangement, and combination of the parts of a device of the specified character which will be first fully described hereinafter and afterwards specifically claimed.

In order that the construction and operation thereof may be readily comprehended, I will now proceed to specifically describe my invention, in connection with the accompanying drawings, illustrating an approved embodiment thereof, in which drawings—

Figure 1:
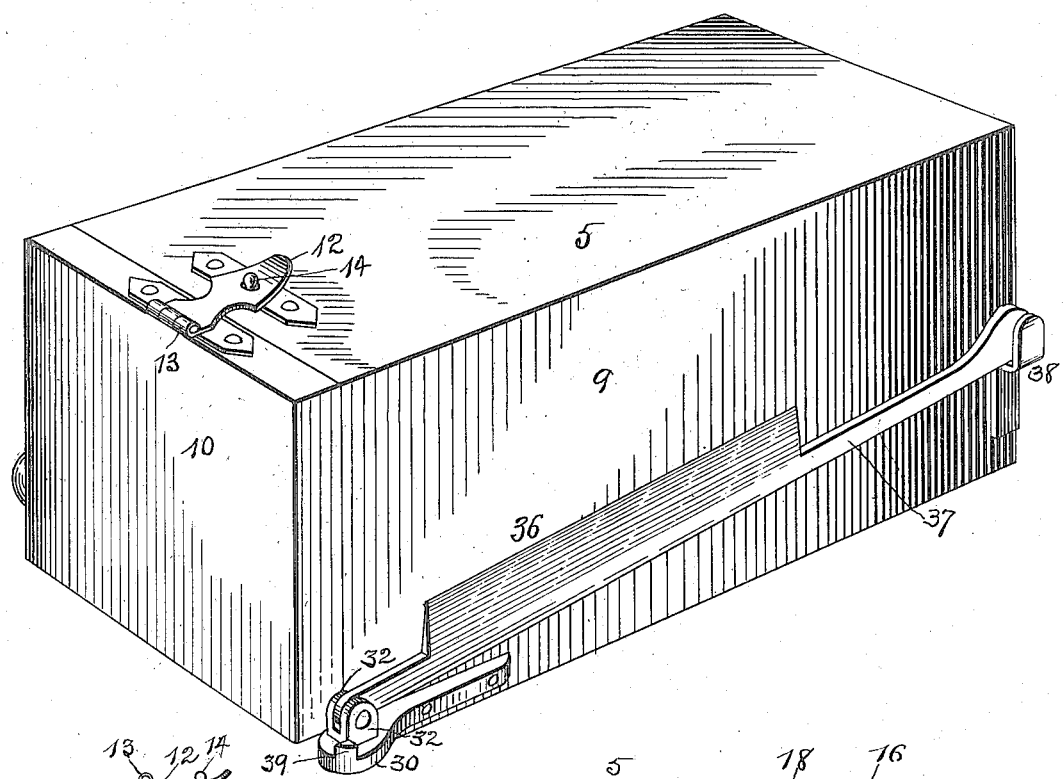
Figure 2:
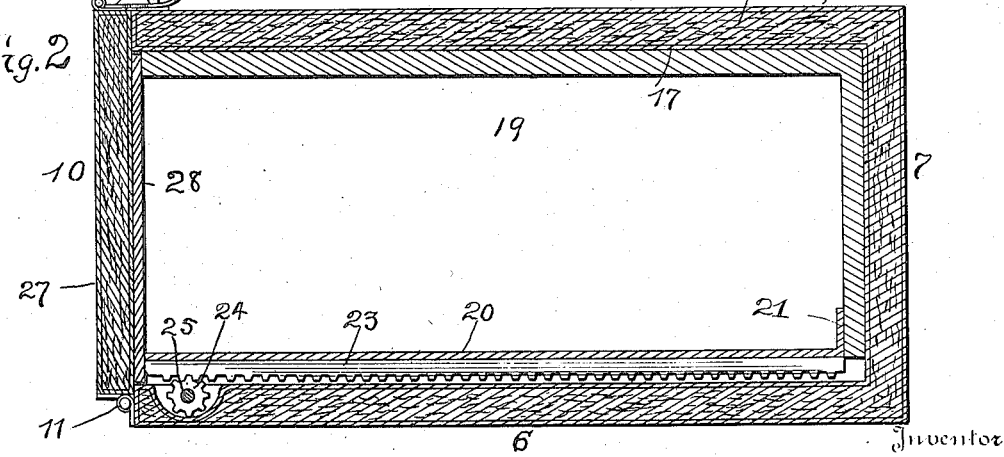

Figure 1 represents my invention in perspective the body being closed, showing the knife in its position of rest, Fig. 2 represents a vertical, longitudinal sectional view of the device with the parts in the same positions as in Fig. 1, Fig. 3 represents a view similar to Fig. 1, with the body open and the knife in position for operation, Fig. 4 represents a transverse, vertical sectional view with the parts in the same position as in Fig. 1.

Like reference characters mark the same parts in all of the figures of the drawings.

Referring specifically to the drawings, 5 represents the top, 6 the bottom, 7 the rear end and 8 and 9 the sides of the body of the device, said body being of elongated rectangular box-like form, and the front end being open and provided with a closure in the form of a door 10 attached by any suitable hinges 11 and provided with a hasp 12 hinged at 13 to the upper edge of the body, and adapted to engage a pin or staple 14 projecting from the top of the body, a staple, when used, affording means for applying a padlock to securely close the body when desired.

The box or body is preferably made with an outer case comprising an outer plate 16 of sheet tin, nickel plated, or aluminum, and an inner plate 17 of similar or other approved metal, between which plates is a lining 18 of asbestos or other suitable non-heat conducting material. Within the outer case is an inner case 19 which will be preferably made of glass, china, porcelain, or aluminum, although any other approved material may be used, said inner case being intended to receive a carrying plate 20 upon which is to be placed a roll or rectangular block of butter, said carrying plate being provided with an upturned flange 21 at its rear end. The inner case 19 is longitudinally slotted in its bottom as at 22 to receive a rack 23 secured to or formed on the under side of the carrying plate 20, of aluminum or other suitable material, which rack, when the carrying plate is in position in the inner case, engaging a pinion 24 on a horizontal shaft 25 suitably journaled in the outer case 15 and provided at one end, as at 26, with a handle projecting beyond the side of said outer case.

The door 10 comprises an outer case 27 which, when the door is closed, abuts against the end of the outer case of the body, and an inner plate 28, which, when the door is closed, projects into the inner case of the body, a rubber or other suitable packing 29 being provided around the edge of said inner plate, to insure a close joint which will prevent the admission of the outer air when the door is closed. The outer and inner plates of the door will preferably be made of aluminum or other suitable metal, but any approved material may be used.

Suitably secured to one side of the outer case near its open end is a bracket 30 in which is provided a vertical bore or seat to receive a pin 31 of a pivot block 32 which may be secured by a nut and washer 33 or other suitable means which will permit of its rotation, said pivot block being bifurcated or provided with jaws 34 between which, suitably pivoted on a pin or pintle 35, is a knife 36 provided at its free end with a suitable handle 37, which, when the knife is at rest, as shown in Fig. 1, rests in and on a bracket 38 secured to the outer case near its closed end. A lug 39 formed integral with the bracket 30 provides an abutment for the rectangular base of the pivot block 32 and coöperates with the adjacent end of the body to guide the cutting movement of the blade 36.

In operation, the door 10 is opened as shown in Fig. 3 and the butter on the carrying plate 20 moved into proper position for the cutting operation of the knife, 36 by rotating the handle 26. The handle 37 of the knife 36 is then disengaged from the supporting bracket 38 and swung outwardly off the body on an axis located at the pin 31 until the rectangular base of the pivot block 32 abuts the adjacent face of the lug 39 and stops the movement thereof. The knife is then swung on the pivot pin 35 to cut through the butter on the carrying plate 20.

It will be understood that any desired size of piece or any number of pieces of butter may be cut by the knife 36 by simply adjusting the carrying plate by means of the handle 26 operating the carrying plate 20.

Having thus described my invention, I claim as new and desire to secure by Letters Patent—

1. In combination a hollow body, a knife, means securing said knife to said body and permitting double pivotal movement thereof on vertical and horizontal axes, and means on the body for supporting said knife in inoperative position.

2. In combination a hollow body, a knife, means securing said knife to said body and permitting double pivotal movement thereof on horizontal and vertical axes, and means to limit the movement of said knife.

3. In combination, an open ended hollow body, a knife, means securing the knife to the body and permitting movement on horizontal and vertical axes, and means for securing the knife to the side of the body when at rest.

4. In combination, an open ended hollow body, a bracket, secured to one side thereof near the open end, vertical pin swiveled in said bracket, jaws at the top of said pin, horizontal pivot in said jaws, and a knife on said pivot between the jaws.

5. In combination, an open ended hollow body, a bracket secured to one side thereof near the open end, vertical pin swiveled in said bracket, jaws at the top of said pin, a horizontal pivot in said jaws, and a lug on the bracket to limit the movement of said pin around its vertical axis.

In testimony whereof I affix my signature in presence of two witnesses.

GEORGE E. TERRY.

Witnesses:
NEWTON G. COHN,
Mrs. W. H. JARDINE.